UNITED STATES PATENT OFFICE.

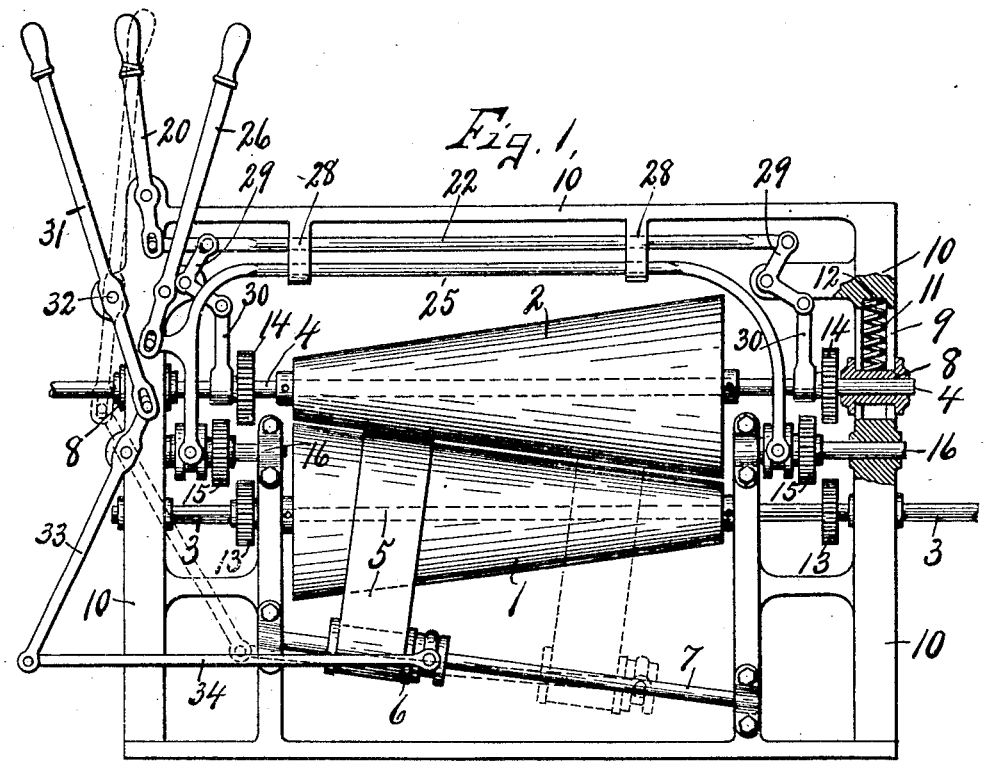

RAY COLE, OF SYRACUSE, NEW YORK.

VARIABLE-SPEED POWER-TRANSMITTING MECHANISM.

No. 856,846.   Specification of Letters Patent.   Patented June 11, 1907.

Application filed April 5, 1907. Serial No. 366,526.

*To all whom it may concern:*

Be it known that I, RAY COLE, of Syracuse, in the county of Onondaga, in the State of New York, have invented new and useful Improvements in Variable-Speed Power-Transmitting Mechanism, of which the following, taken in connection with the accompanying drawings, is a full, clear, and exact description.

This invention relates to certain improvements in variable speed mechanism for self-propelled vehicles in which two rotary frusto conical elements have parallel axes, one of them being adapted to be driven by the other at the same or different speeds through the medium of an interposed sliding connection, as for instance, a contact belt or ring.

My object, therefore, is to provide means whereby the action of the driven cone may be reversed and at the same time to throw the cones out of frictional connection one with the other.

Other objects relating to the specific construction of the driving mechanism and its shifting means will be brought out in the following description.

In the drawings—Figure 1 is an elevation, partly in section, of a differential speed reverse mechanism embodying the various features of my invention. Fig. 2 is an elevation of one end of the cone-rollers showing the driven cone as shifted radially, and the reverse drive gears in mesh, together with portions of the operating mechanisms for shifting the driven cone radially and for throwing one of the reverse drive gears into and out of action. Fig. 3 is a sectional view taken on line 3—3, Fig. 2. Fig. 4 is a detail sectional view of the shifting sleeve for the contact belt.

In carrying out the objects stated, I provide two rotary cones —1— and —2— having parallel axes and preferably mounted upon shafts —3— and —4— respectively with their meeting faces substantially parallel and in close juxtaposition to receive between them a friction transmission element, as a belt —5—. This belt —5— is mounted upon a pulley or roller —6— which is movable along a shaft or guide rod —7—, the latter being parallel with the meeting faces of the cone pulleys —1— and —2—.

The cone —1— may be designated as the driving element, and the cone —2— as the driven element, while the belt —5— may be termed the means for transmitting rotary motion from the driving to the driven element, and by sliding the belt —5— along the meeting faces of the cones, it is obvious that the driven element —2— will be rotated at different speeds.

The driven cone —2— is movable radially of its axis toward and from the driving cone —1—, and for this purpose the ends of this shaft are mounted in bearings —8— which are slidable upon suitable ways —9— of a supporting frame 10— against the action of springs —11—, the latter being interposed between the bearings —8— and abutment 12— on the frame. The object of this radial adjustment of the driven cone is to throw the latter out of operative connection with the driving cone to permit the action of the driving mechanism, including the engine, not shown, independently of the driven mechanism, or rather without propelling the vehicle, and at the same time to permit the reverse drive mechanism to be thrown into operative connection with the driving mechanism. This reverse drive is effected through the medium of gears 13—, —14—, and —15—, the gears 13— and 14— being secured respectively to the driving and driven shafts —3— and —4—, while the gear 15— is mounted upon a separate shaft —16— and is adapted to be moved endwise into and out of mesh with the gears 13— and 14— when the driven cone —2— and its shaft —4— are moved radially away from the driving cone —1—.

I preferably employ separate mechanisms for moving the driving cone —2— away from the cone —1— and for throwing the reverse drive gear 15— into mesh with the gears 13 and 14—, although these mechanisms may be operated simultaneously if desired.

The mechanism for shifting the driven cone —2— radially toward and away from the driving cone —1— preferably consists of a lever —20— and suitable connections with a yoke —22— whereby the movement of the lever in one direction will throw the driven cone out of engagement with the driving cone against the action of the springs —11— and the latter will operate to return the driven cone to its operating position when the lever is released. I preferably employ two sets of gears, 13—, 14— and 15, one set at each end of the cones and connect the reverse drive gears —15— by a yoke —25— which is adapted to be shifted endwise through the medium of a hand lever —26 to throw said gears 15— simultaneously into or out of mesh with their respective gears —13— and 14—. These levers are located within easy reaching distance of the operator of the vehicle where both may be moved simultaneously or separately, as previously stated.

The yoke —22— for shifting the driven cone radially consists of a sliding bar or rod movable in bearings —28— in the frame —10—, and is in this instance, pivotally connected to bell crank levers —29—, which in turn, are pivoted upon the frame —10— and are connected by links —30— to opposite ends of the shaft —4— so that by rocking the lever —20— in one direction, the yoke —22—, lever —23— and links —30— are actuated to move the cone —2— radially away from the cone —1— and out of contact with the belt —5— against the action of springs —11— where it may be held by hand, or by any suitable detent to permit independent rotation of the driving element —1— by the engine, not shown. While in this position the lever —26— may be operated to shift the reverse gear —15— into mesh with the gears —13— and 14— through the medium of the yoke —25— which is operatively connected to the gears 15, and when the reverse gears are thus brought into mesh with each other, the lever —20— may be released to permit the springs —11— to force and to hold the gears —14— in mesh with the gears 15— in which position, the cone —2— is out of frictional contact with belt —5— and is driven directly by the gears —13—, 14— and 15—, but in a reverse direction from that in which it is driven by the belt 5— and cone —1—. When it is desired to propel the vehicle forwardly it is simply necessary to again shift the lever —26— in the opposite direction, thereby throwing the gears 15— out of mesh with the gears —13—, 14—, as shown in Fig. 1, whereupon the springs 11— automatically bring the cone —2— into frictional engagement with the belt —5—, which actuates the driven cone —2— to propel the vehicle forwardly.

The driven element —2— may be driven at different speeds by simply sliding the belt —5— lengthwise along the meeting faces of the cones —1— and —2—, which is effected by sliding the pulley or sleeve —6— along the rod —7—. This axial movement of the sleeve or pulley —6— is accomplished by means of a lever —31—, which is pivoted at —32— to the frame —10— and is connected by any suitable means, as a second lever —33— and link —34— to a grooved collar on the pulley —6—, as best shown in Fig. 1, so that by moving the lever —31— in one direction, or to the high side of the cone —1—, the cone —2— will be driven at a comparatively high rate of speed, and when said lever —31— is shifted to the dotted position shown in Fig. 1, the belt —5— will be shifted to the low side of the cone —1—, and thereby transmit slower motion to the cone —2—, or by shifting said belt to an intermediate position, a medium speed will be given to the driven member —2—.

What I claim is:

1. In a variable speed reverse drive mechanism, two friction cones and a sliding contact member for transmitting motion from one cone to the other, means for shifting said member to vary the speed of the driven cone, means for supporting said cone whereby the driving cone may revolve independently of the driven cone, a reverse drive mechanism, and means for throwing said mechanism into and out of action.

2. A variable speed reverse drive mechanism comprising two cones and a sliding member for transmitting motion from one cone to the other, means for sliding said member to vary the speed of the driven cone, gears connected to the cones and rotating therewith, means for supporting the cones, a sliding gear movable into and out of mesh with said gears to reverse the rotation of the driven cone, and means to slide said gear.

In witness whereof I have hereunto set my hand this 22nd day of March 1907.

RAY COLE.

Witnesses:
H. E. CHASE,
M. M. NOTT.